(12) United States Patent
Khangar et al.

(10) Patent No.: US 10,126,107 B2
(45) Date of Patent: Nov. 13, 2018

(54) TAPE MEASURE WITH REINFORCED TAPE BLADE AND/OR TEAR REDUCING HOOK CONFIGURATION

(71) Applicant: Milwaukee Electric Tool Corporation, Brookfield, WI (US)

(72) Inventors: Abhijeet A. Khangar, Pewaukee, WI (US); Jacob Feuerstein, San Diego, CA (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 15/917,211

(22) Filed: Mar. 9, 2018

(65) Prior Publication Data

US 2018/0195847 A1    Jul. 12, 2018

Related U.S. Application Data

(63) Continuation of application No. PCT/US2017/050117, filed on Sep. 5, 2017.

(60) Provisional application No. 62/501,362, filed on May 4, 2017, provisional application No. 62/468,835, filed on Mar. 8, 2017, provisional application No. 62/384,820, filed on Sep. 8, 2016.

(51) Int. Cl.
*G01B 3/10* (2006.01)

(52) U.S. Cl.
CPC .......... *G01B 3/1082* (2013.01); *G01B 3/1056* (2013.01); *G01B 2003/1076* (2013.01)

(58) Field of Classification Search
CPC .................................... G01B 3/1082
USPC .......................................................... 33/771
See application file for complete search history.

(56) References Cited

U.S. PATENT DOCUMENTS

| | | | |
|---|---|---|---|
| 2,089,209 A | 8/1937 | Keuffel et al. | |
| 2,303,368 A | 12/1942 | Keuffel et al. | |
| 2,471,395 A * | 5/1949 | Keuffel | G01B 3/1082 33/755 |
| RE23,133 E * | 7/1949 | Kueffel et al. | G01B 3/1082 205/122 |
| 2,814,881 A | 12/1957 | Ljungberg | |
| 3,121,957 A | 2/1964 | Brown | |
| 3,214,836 A | 11/1965 | West | |
| 3,330,709 A | 7/1967 | Zelnick | |
| 3,409,988 A | 11/1968 | Zelnick | |

(Continued)

FOREIGN PATENT DOCUMENTS

| | | |
|---|---|---|
| CN | 2705772 | 6/2005 |
| CN | 202066436 | 12/2011 |

(Continued)

OTHER PUBLICATIONS

U.S. Appl. No. 62/639,743, filed Mar. 7, 2018, Khangar et al.

(Continued)

*Primary Examiner* — G. Bradley Bennett
(74) *Attorney, Agent, or Firm* — Reinhart Boerner Van Deuren s.c.

(57) ABSTRACT

A tape measure including a reinforced or coated tape measure blade is provided. The coating is thicker than the metal inner layer of the tape blade. The coating provides a reinforced tape blade such that elongate tape blade may have a pinch load threshold of greater than 50 lbs. and/or a pinch height at break of less than 1.5 mm. A hook assembly may also provide for reduced stress at the end of the tape blade.

20 Claims, 11 Drawing Sheets

(56) References Cited

U.S. PATENT DOCUMENTS

| | | |
|---|---|---|
| 3,439,428 A | 4/1969 | Zelnick |
| 3,450,367 A | 6/1969 | Edgell |
| 3,889,897 A | 6/1975 | Van Zelderen |
| 3,942,738 A | 3/1976 | Rutty |
| 4,198,458 A | 4/1980 | Mitsuishi et al. |
| 4,286,387 A | 9/1981 | Di Diego |
| 4,531,688 A | 7/1985 | Gall |
| 4,835,870 A | 6/1989 | Rauch et al. |
| 4,926,566 A | 5/1990 | McMurtry et al. |
| 5,471,761 A | 12/1995 | Cheng |
| 5,738,743 A | 4/1998 | Lee |
| 5,820,057 A | 10/1998 | Decarolis et al. |
| 5,895,539 A | 4/1999 | Hsu |
| 5,979,238 A | 11/1999 | Boege et al. |
| 6,115,933 A | 9/2000 | Li |
| 6,148,534 A | 11/2000 | Li |
| 6,243,964 B1 | 6/2001 | Murray |
| 6,249,986 B1 | 6/2001 | Murray |
| 6,282,808 B1 | 9/2001 | Murray |
| 6,324,769 B1 | 12/2001 | Murray |
| 6,440,502 B1 | 8/2002 | Lee |
| 6,449,866 B1 | 9/2002 | Murray |
| 6,499,226 B1 * | 12/2002 | Reda ............ G01B 1/00 33/755 |
| 6,637,124 B2 | 10/2003 | Pederson |
| 6,643,947 B2 | 11/2003 | Murray |
| 6,804,899 B2 | 10/2004 | Murray |
| 6,907,676 B2 | 6/2005 | Liao |
| 7,398,604 B2 | 7/2008 | Murray |
| 7,565,751 B2 | 7/2009 | Murray |
| 7,856,735 B2 | 12/2010 | Allezy et al. |
| 8,117,762 B2 | 2/2012 | Delneo et al. |
| 8,117,763 B2 | 2/2012 | Delneo et al. |
| 8,356,418 B1 | 1/2013 | Hall |
| 8,584,373 B2 | 11/2013 | Murray et al. |
| 2001/0053436 A1 | 12/2001 | Li |
| 2002/0073570 A1 | 6/2002 | Conder |
| 2002/0129509 A1 | 9/2002 | Evans, III |
| 2004/0071869 A1 | 4/2004 | Gilliam et al. |
| 2006/0053649 A1 | 3/2006 | Greally |
| 2006/0059703 A1 * | 3/2006 | Hernandez, Jr. ...... G01B 3/1082 33/757 |
| 2006/0130352 A1 | 6/2006 | Huang |
| 2007/0074417 A1 * | 4/2007 | Sun ............ G01B 3/1082 33/755 |
| 2007/0079520 A1 | 4/2007 | Levine |
| 2009/0090016 A1 * | 4/2009 | Roach ............ G01B 3/1082 33/770 |
| 2011/0232119 A1 | 9/2011 | Smalls |
| 2012/0036727 A1 * | 2/2012 | McCarthy ............ B43K 23/001 33/760 |
| 2013/0067759 A1 | 3/2013 | Murray et al. |

FOREIGN PATENT DOCUMENTS

| | | |
|---|---|---|
| CN | 202432942 | 9/2012 |
| CN | 202757538 | 2/2013 |
| CN | 204612629 | 9/2015 |
| CN | 205482653 | 8/2016 |
| DE | 19628318 | 3/1998 |
| EP | 0100138 | 2/1984 |
| EP | 1411319 | 4/2004 |
| EP | 1444479 | 8/2004 |
| EP | 1647797 | 6/2012 |
| EP | 2400258 | 11/2014 |
| WO | WO02057710 | 7/2002 |
| WO | WO03031903 | 4/2003 |
| WO | WO2004063659 | 7/2004 |
| WO | WO17172683 | 10/2017 |

OTHER PUBLICATIONS

International Search Report and Written Opinion for International Application No. PCT/US2017/050117, dated Dec. 12, 2017, 16 pages.

DeWALT, 16 FT Tape Measure—DWHT36405 Brochure, <https://www.dewalt.com/en-us/products/hand-tools/measuring-and-layout-tools/16-ft-tape-measure/dwht36105>, a commercially available tape measure including a tape measure blade believed to be representative of a tape measure blade commercially available before Sep. 8, 2016, 5 pages.

Stanley, 16 ft FATMAX Tape Measure—33-7416 Brochure, <https://www.stanleytools.com/en-us/products/hand-tools/measuring-layout/fatmax-tape-measure/16-ft-fatmax-tape-measure/33-716>, a commercially available tape measure including a tape measure blade believed to be representative of a tape measure blade commercially available before Sep. 8, 2016, 6 pages.

DeWALT, 16' X 1-¼" Premium Tape—DWHT33924 Brochure, <https://www.dewalt.com/en-us/product-repository/products-dewalt/2016/04/13/16/dwht33924>, a commercially available tape measure including a tape measure blade believed to be representative of a tape measure blade commercially available before Sep. 8, 2016, 5 pages.

Milwaukee, 16ft Magnetic Tape Measure—48/22/7116 Brochure, <https://www.milwaukeetool.com/Products/Hand-Tools/Measuring/Short-Tape-Measures/48-22-7116>, a commercially available tape measure representative of a tape measure blade commercially available before Sep. 8, 2016, 3 pages.

* cited by examiner

TAPE MEASURE WITH REINFORCED TAPE BLADE AND/OR TEAR REDUCING HOOK CONFIGURATION

CROSS-REFERENCE TO RELATED PATENT APPLICATIONS

The present application is a continuation of International Application No. PCT/US2017/050117, filed Sep. 5, 2017, which claims the benefit of and priority to U.S. Provisional Application No. 62/384,820, filed on Sep. 8, 2016, to U.S. Provisional Application No. 62/468,835, filed on Mar. 8, 2017, and to U.S. Provisional Application No. 62/501,362, filed on May 4, 2017, which are incorporated herein by reference in their entireties.

BACKGROUND OF THE INVENTION

The present invention relates generally to the field of tools. The present invention relates specifically to a tape measure, measuring tape, retractable rule, etc., that includes a tape measure blade with a reinforcing coating on the tape blade and/or tear reducing hook configuration.

Tape measures are measurement tools used for a variety of measurement applications, including in the building and construction trades. Some tape measures include a graduated, marked blade wound on a reel and also include a retraction system for automatically retracting the blade onto the reel. In some such tape measure designs, the retraction system is driven by a coil or spiral spring that is tensioned, storing energy as the tape is extended, and that releases energy to spin the reel, winding the blade back onto the reel such that automatic or non-manual tape retraction is provided. In some other tape measure designs, retraction of the tape is controlled via a manual crank, and such tape measure blades tend to have a long length.

SUMMARY OF THE INVENTION

One embodiment of the invention relates to a tape measure including a reinforced tape blade. The tape blade has a metal inner layer, a first coating layer coupled to a upper surface of the metal inner layer, and a second coating layer coupled to a lower surface of the metal inner layer. The combined thickness of the first and second coating layers is greater than the thickness of the metal inner layer. In a specific embodiment, the combined maximum thickness of the first and second coating layers is greater than the maximum thickness of the metal inner layer.

Another embodiment of the invention relates to a tape measure. The tape measure includes a housing, a reel rotatably mounted within the housing and an elongate blade wound around the reel. The elongate blade includes an elongate metal core having an upper surface, a lower surface and a first thickness, T1, measured between the upper surface and the lower surface. The upper surface includes a concave curved section and the lower surface includes a convex curved section. The elongate blade includes an upper polymer coating coupled to and covering the upper surface of the elongate metal core. The upper polymer coating has a second thickness, T2, and an upper surface defining the uppermost surface of the elongate blade. The elongate blade includes a lower polymer coating coupled to and covering the lower surface of the elongate metal core. The lower polymer coating has a third thickness, T3, and a lower surface defining the lowermost surface of the elongate blade. The elongate blade includes an ink layer located between the upper surface of the elongate metal core and the upper polymer coating forming a series of measurement markings, and T2+T3≥T1. The tape measure includes a spring coupled to the reel such that when the elongate blade is unwound from the reel to extend from the housing the spring stores energy and the spring releases energy driving rewinding of the elongate blade on to the reel. The tape measure includes a hook assembly coupled to an outer end of the elongate blade.

Another embodiment of the invention relates to a tape measure including a housing, a reel rotatably mounted within the housing and an elongate blade wound around the reel. The elongate blade includes an elongate metal core having an upper surface, a lower surface and a metal thickness measured between the upper surface and the lower surface. The elongate blade includes a polymer coating surrounding the elongate metal core when viewed in cross-section and extending contiguously lengthwise for at least 6 ft. along a length of the elongate metal core. The polymer coating has a polymer coating thickness. The elongate blade includes an ink layer located between the elongate metal core and the polymer coating, and the ink layer forms a series of measurement markings. The polymer coating thickness is greater than the metal thickness. The tape measure includes a spring coupled to the reel such that when the elongate blade is unwound from the reel to extend from the housing the spring stores energy and the spring release energy driving rewinding of the elongate blade on the reel. The tape measure includes a hook assembly coupled to an outer end of the elongate blade.

Another embodiment of the invention relates to a tape measure includes a housing, a reel rotatably mounted within the housing and an elongate blade wound around the reel. The elongate blade includes an elongate metal core having an upper surface, a lower surface and a metal thickness measured between the upper surface and the lower surface. The elongate blade includes a polymer coating surrounding the elongate metal core when viewed in cross-section and extending contiguously lengthwise for at least 6 ft. along a length of the elongate metal core. The polymer coating has a polymer coating thickness. The elongate blade includes an ink layer located between the elongate metal core and the polymer coating, and the ink layer forms a series of measurement markings. The elongate blade has a pinch load threshold of greater than 50 lbs. The tape measure includes a spring coupled to the reel such that when the elongate blade is unwound from the reel to extend from the housing the spring stores energy and the spring releases energy driving rewinding of the elongate blade on the reel. The tape measure includes a hook assembly coupled to an outer end of the elongate blade.

Another embodiment of the invention relates to a tape measure hook assembly having an upper and/or lower tab configured to reduce tape tear potential, increase flexibility, decrease tape whip, etc. Another embodiment of the invention relates to a tape blade designed to reduce tape tear potential, increase flexibility, decrease tape whip, etc.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Figure 1:
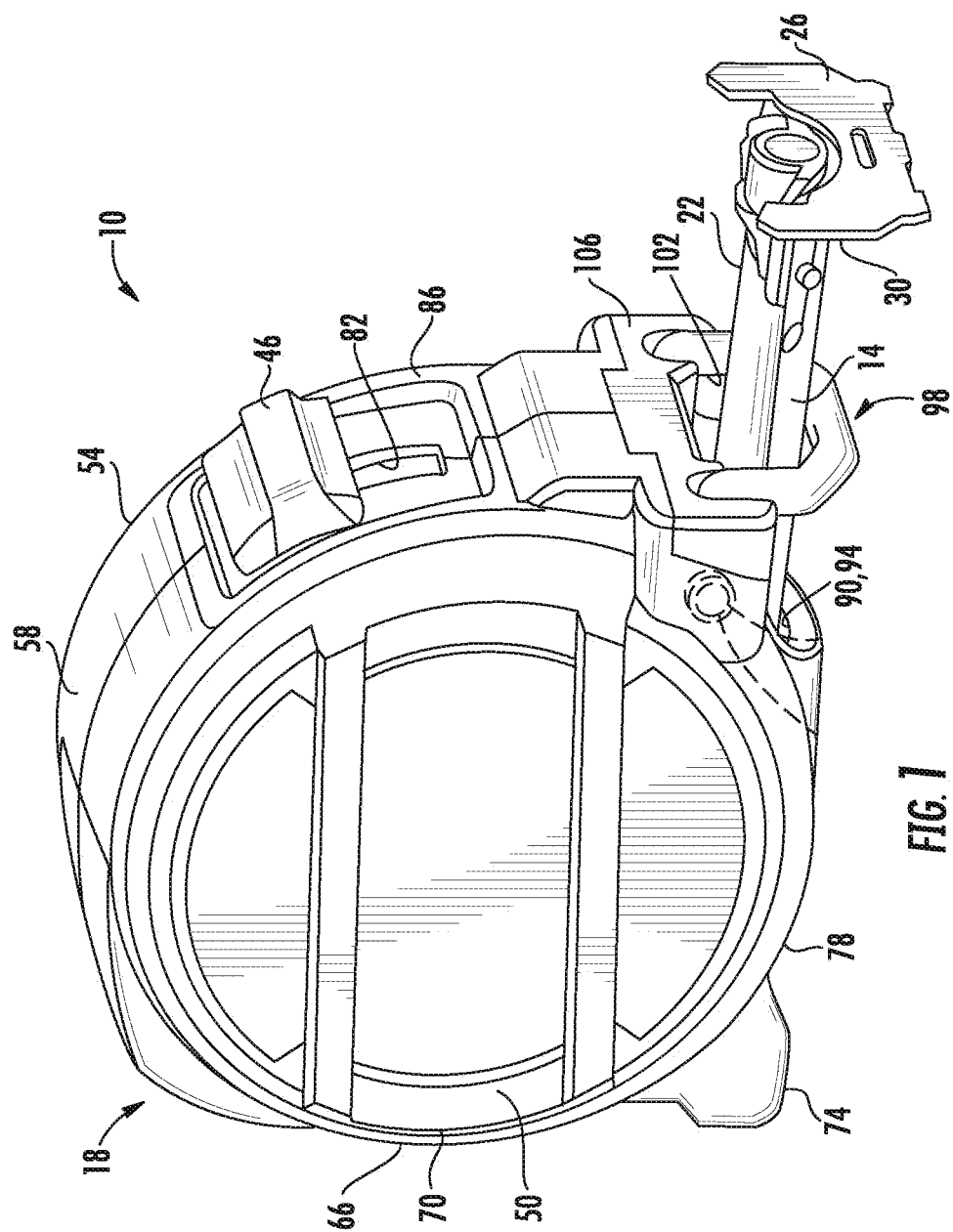
FIG. 1 is a left side perspective view of a tape measure, according to an exemplary embodiment.

Referring generally to the FIGS. 1-8, various embodiments of a tape measure are shown. Various embodiments of the tape measure discussed herein include an innovative polymer coated metal blade for a tape measure. Specifically, the tape measure blade discussed herein includes thick coatings of polymer material coupled to upper and/or lower surfaces of an inner layer of metal formed from a thin, elongate strip of metal material. The thickness, hardness, elasticity, and/or material type, etc. of the polymer coating is selected to provide a tape measure blade having improved crack or break resistance as compared to tape measure blades having other coating thicknesses or other coating materials.

In particular, Applicant has found that by forming a tape blade where the total thickness of the polymer coating material (e.g., the combined thickness of both the upper and lower layers of polymer coating material) is greater than (e.g., at least 2×, at least 3×, at least 4×, between 2× and 10×, between 3× and 5×, etc.) the thickness of the inner metal layer provides a tape blade particularly resistant to breakage (e.g., as tested utilizing a pinch test described below). Without being bound by a particular theory, in at least some embodiments, Applicant hypothesizes that the thick coating discussed herein limits the radius of curvature that the metal material of the tape blade is exposed to when crimped/bent and thereby reduces the risk that metal material will crack. Further, in at least some embodiments, Applicant hypothesizes that the thick coating discussed herein acts to hold the metal material together in the event of small crack formation, which limits crack propagation and tape blade breakage.

In general, Applicant understands that the art has typically viewed increasing the size of the tape measure housing as undesirable due to the difficulty gripping, holding, transporting, etc., a large sized tape measure. For at least this reason, Applicant understands that the art has typically not seen increasing tape blade coating thickness as a viable means for strengthening the tape blade due to the increased size of such blades when wound onto a reel within a tape measure housing. Accordingly, at least in some embodiments, the reinforced tape blade discussed herein is used in conjunction with one or more other components designed to reduce the size of other internal components located within the tape measure housing, which in turn allows more of the space within the tape measure housing to be occupied by the thickly coated, reinforced tape measure blade for a given outer housing size dimension.

In specific embodiments, the tape measure may include two or more small diameter coil springs (e.g., power springs) as part of the tape blade retraction system, which in turn allows the size of the outer diameter of the housing to be reduced, as compared to a similar tape measure using one large coil spring for retraction. Similarly, in specific embodiments, the tape measure may include a reduction gear train that allows for a smaller diameter, more energy dense spring as compared to a similar tape measure using a coil spring with no gear train for retraction.

In further specific embodiments, the tape blade has a length suitable for retraction via a spring based retraction system. In specific embodiments, the length of the tape blade is less than 50 feet or more specifically less than 40 feet. In specific embodiments, the length of the tape blade is 35 ft., 30 ft., 25 ft., or 16 ft. In further specific embodiments, the tape blade that has a curved cross-sectional shape. In such embodiments, the tape blade that has a shape in which the upper surface is a concave curved surface and the lower surface of the blade is a convex curved surface. In further specific embodiments, the tape blade is structured to have a relatively significant stand-out length (i.e., the length of tape blade that can extend from the housing while supporting itself without buckling), and in some such embodiments, the tape stand out is at least 1 foot, at least 3 feet, at least 6 feet, less than 10 feet, etc. Applicant believes these structures differentiate the tape measure of the present disclosure from very long (e.g., 100 ft. or more) crank-retracted tape measures.

Figure 2:
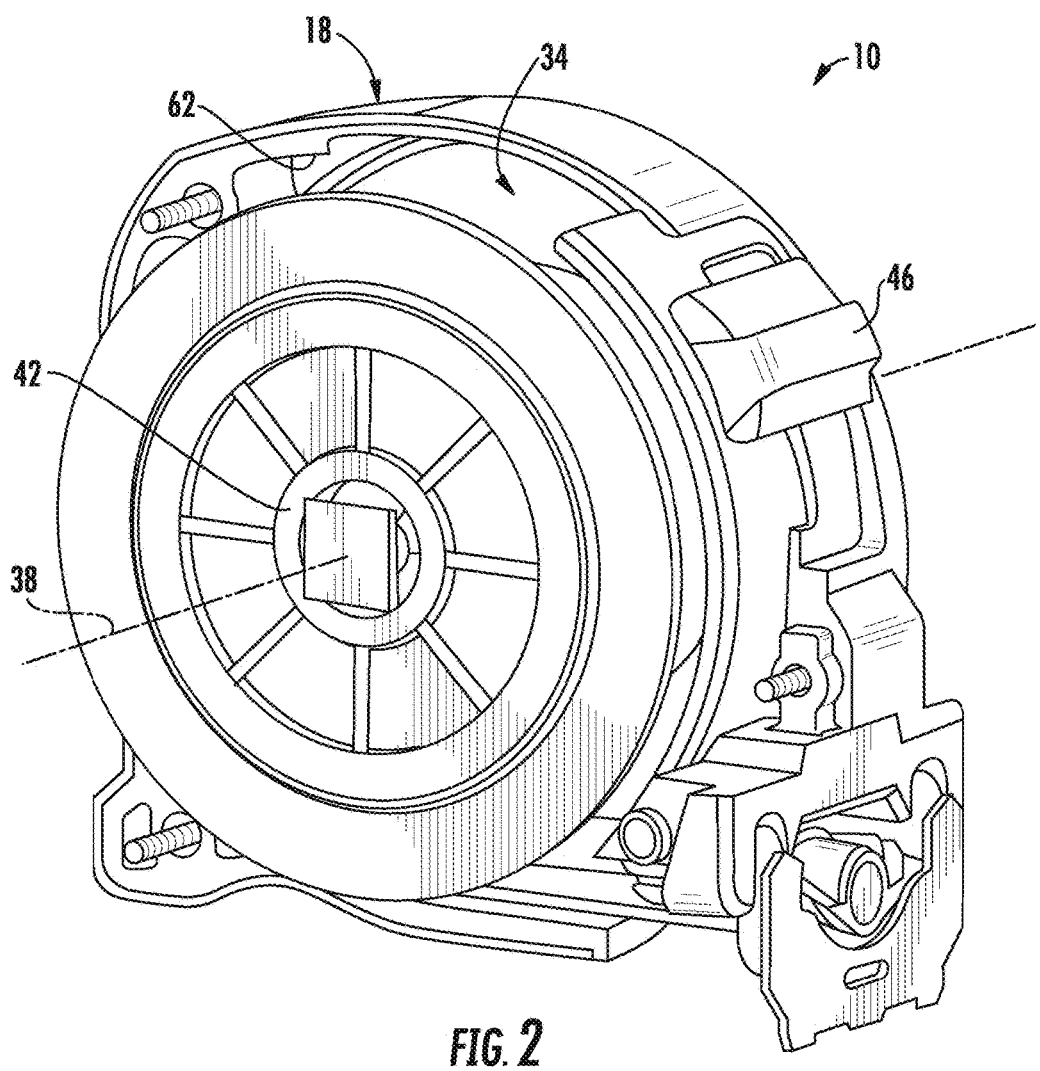
FIG. 2 is a left side perspective view of the tape measure of FIG. 1 with a portion of the tape measure housing removed, according to an exemplary embodiment.

Referring to FIG. 1 and FIG. 2, a length measurement device, such as tape measure 10, is shown according to an exemplary embodiment. Tape measure 10 includes a coilable tape blade 14 and a housing 18. In general, tape blade 14 is an elongate strip of material including a plurality of graduated measurement markings (see FIG. 9), and in specific embodiments, tape blade 14 is an elongate strip of metal material (e.g., steel material) that includes an outer most end coupled to a hook assembly, shown as hook assembly 26. As discussed in more detail below, tape blade 14 may include various coatings (e.g., polymer coating layers) to help protect tape blade 14 from cracking during whip or pinch. Further, tape blade 14 may include any combination of tape blade features of the various embodiments discussed herein. In addition, hook assembly 26 may include any of the hook and tab designs or features discussed below regarding FIGS. 9-23.

As shown in FIG. 1, a variable-length extended segment 22 of the tape blade 14 is retractable and extendable from the housing 18. A hook assembly 26 is fixedly coupled to an outer end portion 30 of tape blade 14.

As shown in FIG. 2, the non-extended portion of tape blade 14 is wound onto a reel 34, which is surrounded by housing 18. Reel 34 is rotatably disposed about an axis 38 of tape measure 10, and a retraction mechanism 42 is coupled to reel 34 and configured to drive reel 34 about rotation axis 38 which in turn provides powered retraction of tape blade 14. Retraction mechanism 42 may include one or more elongated spiral springs that provides the retraction energy to retraction mechanism 42. A tape lock 46 is provided to selectively engage tape blade 14, which acts to restrain retraction mechanism 42 such that extended segment 22 of tape blade 14 remains at a desired length.

In specific embodiments, retraction mechanism 42 is configured to provide for a relatively small housing size, despite the increased blade thickness. In one embodiment, retraction mechanism 42 includes two or more spiral springs (e.g., power springs) which will deliver a desired level of torque while decreasing the outer diameter of the space occupied by the springs (at least as compared to the outer diameter of a single spiral spring that delivers the same level of torque). In other embodiments, retraction mechanism 42 includes a reduction gear train located between the tape reel and spring such that each rotation of the tape reel results in less than one rotation of the spring. This arrangement allows for a smaller diameter, more energy dense spring as compared to a similar tape measure using a coil spring with no gear train for retraction.

By utilizing one or more size reduction mechanism, e.g., gearing, multiple springs, etc., a thicker tape blade may be used without the size of the housing growing for the same length of tape. In some embodiments, a coil spring having a width wider than the width of tape blade 14 may be used, which allows for a lower diameter/height spring to be used. In some such embodiments, the coil spring has a width between 110% and 150% of the width tape blade 14, specifically, the coil spring has a width between 120% and 135% of the width tape blade 14, and more specifically, the coil spring has a width of approximately 130% of the width tape blade 14. In this way, the spring may be of a smaller height, allowing reduction of the height of the housing relative to smaller-width, but larger diameter spring, which may allow for a smaller height housing with a thicker tape.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 has a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74 which extends from a lower portion 78 of the peripheral wall 58.

A slot 82 is defined along a forward portion 86 of peripheral wall 58. Slot 82 provide an opening in the tape measure housing which allows tape lock 46 to extend into housing 18. In addition, slot 82 provides a length sufficient to allow tape lock 46 be moved relative to housing 18 between locked and unlocked positions.

Below the slot 82, a tape port 90 is provided in peripheral wall 58. Tape port 90 has an arcuate shape 94, corresponding to an arcuate cross-sectional profile of tape blade 14. The tape port 90 allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape 14 is in the retracted position, a rear surface of hook assembly 26 abuts guard 102.

Figure 3:
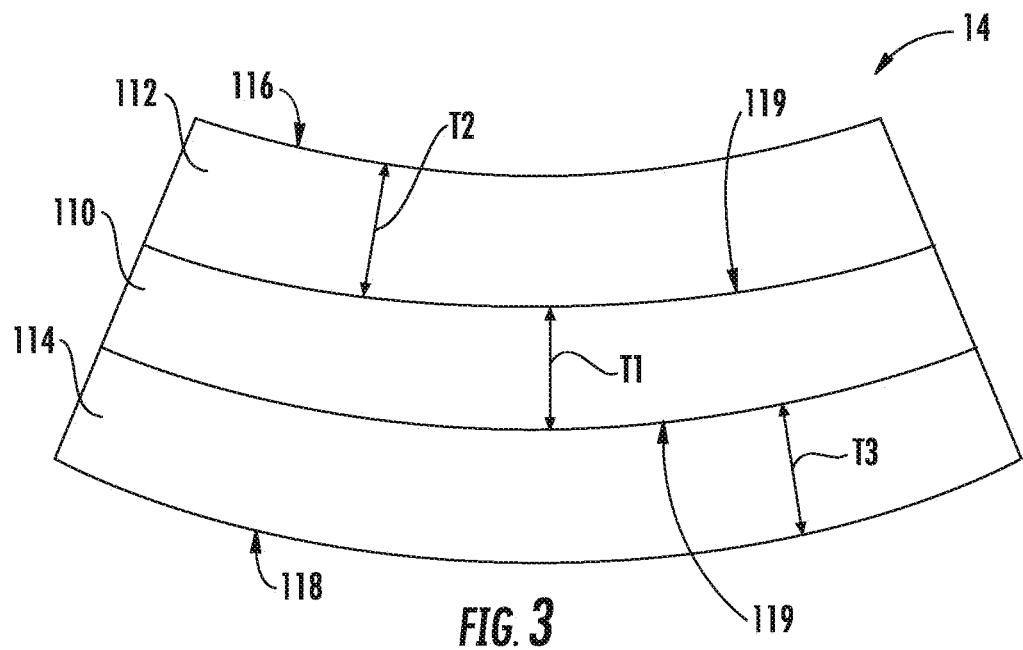
FIG. 3 is a cross-sectional view of a reinforced tape blade of the tape measure of FIG. 1, according to an exemplary embodiment.

Referring to FIG. 3, a cross-sectional view of tape blade 14 is shown. Tape blade 14 includes a core or inner layer 110 formed from a thin, elongate strip of metal material. In a specific embodiment, inner layer 110 is formed from a strip of steel material. In a specific embodiment, inner layer 110 has a thickness, T1, between 0.09 mm and 0.2 mm, specifically, between 0.1 mm and 0.18 mm (with up to a 25% thickness variation), and more specifically of 0.1 mm to 0.13 mm. Inner layer 110 may be formed in a concavo-convex configuration (as shown in FIG. 3), which may provide for improved tape standout. Inner layer 110 may be an alloyed spring steel, alloyed high strength steel, etc. In one embodiment, the steel is of a hardness between 50-54 RHC (Rockwell hardness C). In another embodiment, the steel is of a hardness between 45-60 RHC.

Tape blade 14 includes an upper coating layer 112 coupled to (e.g., attached, bonded, glued, etc.) onto the concave upper surface of inner metal layer 110 and a lower coating layer 114 coupled to (e.g., attached, bonded, glued, etc.) onto the convex lower surface of inner metal layer 110. In general, coating layers 112 and 114 are formed from a polymer material, and in a specific embodiment, are formed from a nylon material. As shown, coating layer 112 has an upper surface 116 that defines the uppermost surface of tape blade 14, and coating layer 114 has a lower surface 118 that defines the lowermost surface of tape blade 14. Ink layers 119 may be located between coating layers 112 and 114 forming measurement markings or indicia (see FIG. 9). In specific embodiments, coating layers 112 and 114 are formed from a material that has a modulus of elasticity less than the modulus of elasticity of the metal material of inner layer 110. In specific embodiments, coating layers 112 and 114 are formed from a material that has a hardness less than the hardness of the metal material of inner layer 110. In specific embodiments, the coating layers discussed herein are formed from a nylon 12 material and/or a nylon 6/6 material.

As shown in FIG. 3, coating layer 112 has thickness, T2, and coating layer 114 has a thickness, T3. In specific embodiments, the total thickness of the tape blade coating (i.e., the combined thickness of layers 112 and 114, T2+T3) is greater than T1. In specific embodiments, T2+T3≥2×T1, T2+T3≥3×T1, T2+T3≥4×T1, 10×T1≥T2+T3≥2×T1 or 5×T1≥T2+T3≥3×T1. Applicant has found that the substantial thickness of coating layers 112 and 114 relative to the thickness of layer 110 limits the radius of curvature experienced by layer 110 during pinch tests (see Pinch Test description below), which in turn limits the likelihood that layer 110 will crack when pinched or crimped.

In specific embodiments, T2+T3 is between 0.2 mm and 0.6 mm and specifically between 0.3 mm and 0.5 mm. In one embodiment, T2 is substantially equal to T3 (e.g., is within 5% of T3). In another embodiment, T2 is greater than T3 (e.g., is more than 5% greater than T3). In another embodiment, T3 is greater than T2 (e.g., is more than 5% greater than T2).

In one embodiment, the total tape blade thickness (inclusive of all of the coating and the core layer, i.e., T1+T2+T3) is approximately 0.4 mm (e.g., 0.4 mm plus or minus 10%, or plus or minus 1%). The distribution of the width of the coating layers 112 and 114 relative to the layer 110 may be the same or wider.

In one embodiment, coating layers 112 and 114 may be applied over the entire length of inner layer 110. In one embodiment, coating layers 112 and 114 are applied over at least 6 feet of the length of inner layer 110, specifically over at least 8 feet of the length of inner layer 110, and more specifically over at least 10 feet of the length of inner layer 110. In specific embodiments, these coating lengths are contiguous coating lengths. This may provide increased tear resistance in areas of the tape blade 14 prone to increased wear, while maintaining compactness of the tape relative to a tape blade that has the coating over the entire length. In one embodiment, coating layers 112 and 114 begin at the end of the tape blade 14 proximate the hook. In another embodiment, the coating starts at a location of the blade spaced apart from the end proximate hook assembly 26.

In some embodiments, coating layers 112 and/or 114 do not have uniform thicknesses along the width and/or length of tape blade 14. In some such embodiments, coating layers 112 and/or 114 may be applied in a pattern (e.g., a honey-comb pattern, a checkered pattern, etc.) where there are portions of thicker and thinner coating distribution across both the length and width of the tape blade 14. In such embodiments, T2 and T3 shown in FIG. 3 represent the thickness measured through the thickest portion of the coating pattern. In some such embodiments, the ranges of T2 and T3 discussed herein represent the maximum thickness of coating layers 112 and 114 at any portion along the length of tape blade 14. In some such embodiments, the combined maximum coating and blade thickness may be 0.4 mm, but in other areas along the length and width of the tape blade, the coating and blade thickness will be less (e.g., as measured at the thinner coating portions of the coating pattern). In other embodiments, the ranges of T2 and T3 discussed herein represent the average thickness of coating layers 112 and 114 measured at all of thickest portions of the coating pattern along the length and width of tape blade 14.

Coating layers 112 and 114 may be applied as a laminate, nylon extrusion, film attached with adhesive, power/spray on coating. In one embodiment, the coating layer(s) are configured such that even if the steel core were to fracture, the coating layer is configured to contain the steel core and to maintain the integrity of the blade (e.g., the coating will tend not to tear).

Figure 4:
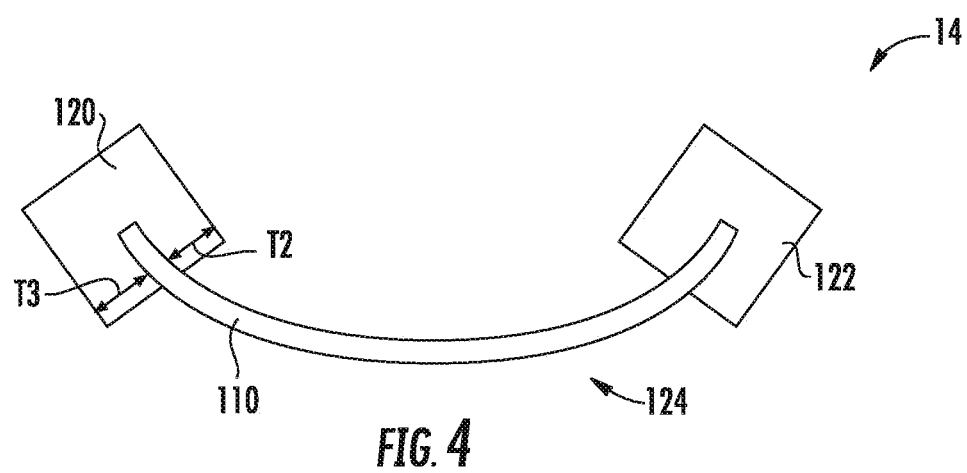
FIG. 4 is a cross-sectional view of a reinforced tape blade of the tape measure of FIG. 1, according to another exemplary embodiment.

As shown in FIGS. 4-7, tape blade 14 may have a variety of coating arrangements and shapes. Specifically, in the embodiment of FIG. 4 tape blade 14 has edge coating layers 120 and 122. In general, edge coating layers 120 and 122 are substantially the same as coating layers 112 and 114 except as discussed herein. As shown in FIG. 4, coating layers 120 and 122 may be applied adjacent the lateral edges and/or surrounding the lateral edges of inner layer 110. In this embodiment, a central area 124 along the upper and/or lower surface of inner layer 110 may have a thin coating or no coating. In such embodiments, upper and lower portions of coating layers 120 and 122 may have thicknesses, T2 and T3, as discussed above regarding layers 112 and 114.

Figure 5:
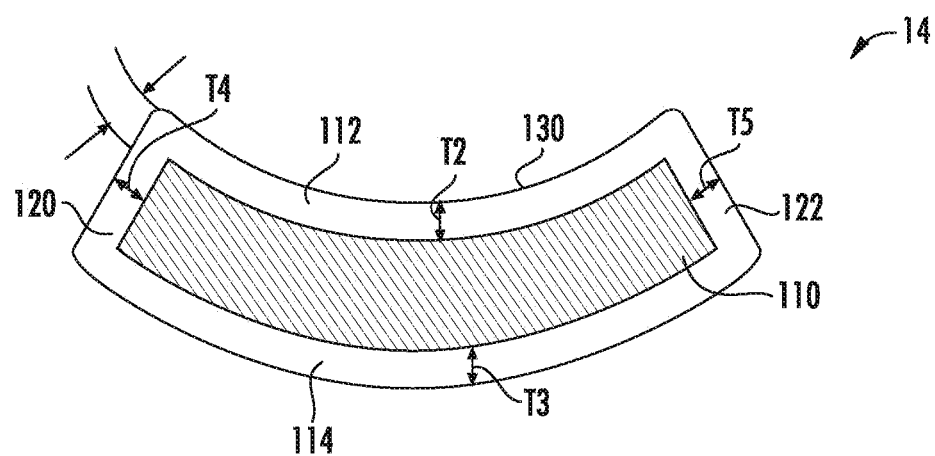
FIG. 5 is a cross-sectional view of a reinforced tape blade of the tape measure of FIG. 1, according to another exemplary embodiment.

Referring to the embodiment of FIG. 5, tape blade 14 may have a coating layer 130. In this embodiment, coating layer 130 combines upper and lower coatings 112 and 114 (discussed above regarding FIG. 3) with edge coating layers 120 and 122 (discussed above regarding FIG. 4). As can be seen in FIG. 5, the combination of upper and lower coatings 112 and 114 with edge coating layers 120 and 122 forms a coating 130 that completely surrounds core 110. In specific embodiments, substantially the entire length of tape blade 14 (e.g., at least 90%, 95%, 99%, etc. of the length) is completely surrounded by coating 130.

As shown in FIG. 5, edge coating layers 120 and 122 each have a thickness, T4 and T5, respectively, measured in the width direction, perpendicular to the edge surface of core 110. In the specific embodiment shown in FIGS. 5, T4 and T5 are substantially equal to each other, e.g., are within plus or minus 25%, specifically plus or minus 10%, more specifically plus or minus 5% and even more specifically within plus or minus 1%, of each other. In some embodiments, T2, T3, T4 and T5 are all substantially equal to each other such that coating 130 has a substantially consistent thickness relative to core 110 at all circumferential positions around core 110 at one or more longitudinal cross-sectional locations as shown in FIG. 5.

In specific embodiments, when coating 130 is applied in a pattern, such as a cross-hatched or honey-combed pattern, to the upper and lower surfaces of core 110, T2, T3, T4 and T5 shown in FIG. 5 represent the thickness through the raised portions of the honey-comb pattern. In specific embodiments, T2, T3, T4 and T5 are between 0.07 mm to 0.19 mm, with the total thickness (i.e., between the lower surface of coating layer 114 and the upper surface of coating layer 112) being between 0.26 mm and 0.5 mm. In another embodiment, T2 is greater than T3, and in some such embodiments, T2 is 0.08 mm to 0.18 mm and T3 is 0.03 mm to 0.07 mm.

In various embodiments, the thicknesses, T4 and T5, of edge coating layers 120 and 122 are different than thicknesses, T2 and T3, of the upper and lower coating layers 112 and 114, such that the thickness of coating 130 varies around inner core 110. In such embodiments, T4 and T5 are between 0.03 mm and 1 mm.

Figure 6:
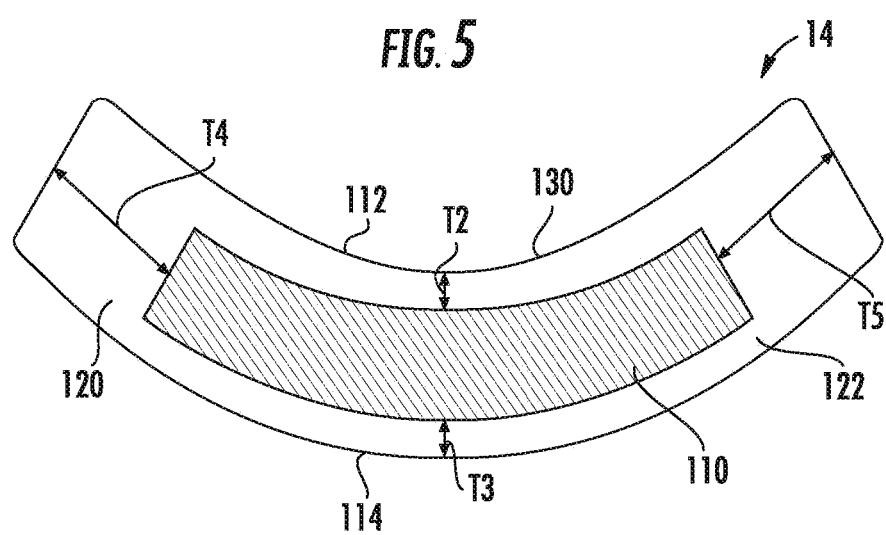
FIG. 6 is a cross-sectional view of a reinforced tape blade of the tape measure of FIG. 1, according to another exemplary embodiment.

In a specific embodiment, as shown in FIG. 6, both T4 and T5 are greater than T2 and/or T3, such that edge coating layers 120 and 122 provide an increased coating material adjacent the edges of inner core 110. In some such embodiments, T2 and T3 are 0.07 mm to 0.19 mm, and T4 and T5 are greater than 0.07 mm and less than or equal to 1 mm. In such embodiments, the increased thickness of edge coating layers 120 and 122 increase the overall width of tape blade 14, increasing strength and/or resistance to damage/tearing without the need to increase the size of inner core 110. In embodiments where inner core 110 is formed from a metal material, utilizing thicker edge coating layers 120 and 122 provides for increased strength without increasing the amount of metal material used to form tape blade 14.

Figure 7:
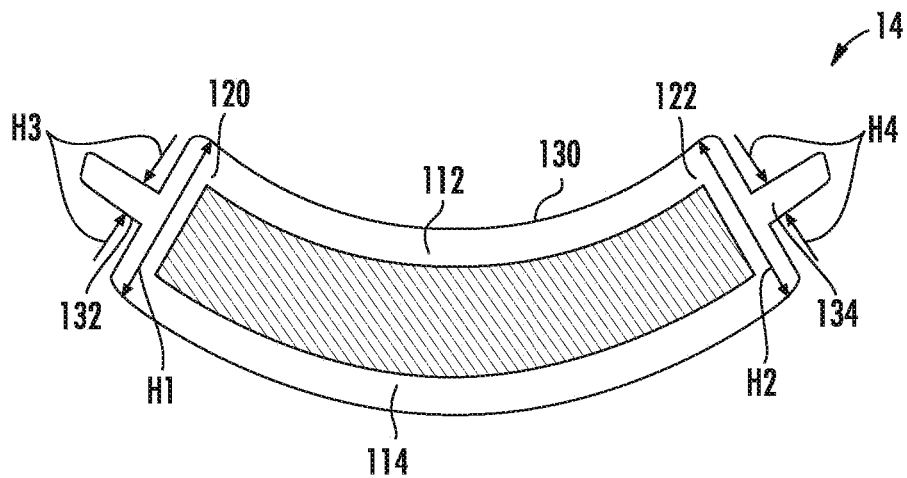
FIG. 7 is a cross-sectional view of a reinforced tape blade of the tape measure of FIG. 1, according to another exemplary embodiment.

Referring to FIG. 7, in various embodiments, edge coating layers 120 and 122 may be configured such that the height of the edge coating layer varies at different positions in the width direction away from inner core 110. As shown in FIG. 7, edge coating layers 120 and 122 may include thinned outer portions 132 and 134.

In one embodiment as shown in FIG. 7, edge coating layers 120 and 122 each have a first section having a height H1 and H2 respectively, and thin outer portions 132 and 134 have heights H3 and H4, respectively. As shown in FIGS. 7, H3 and H4 are less than H1 and H2, respectively, specifically are less than 50% of H1 and H2, respectively and more specifically are less than 30% of H1 and H2 respectively. In such embodiments, thin outer portions 132 and 134 provide extra width and resulting extra strength to tape blade 14, while also utilizing less total coating material than edge coating arrangements such as that shown in FIG. 6.

Pinch Test and Examples

Testing data for three tape measure blades having different total thicknesses and coating thicknesses are shown in Table 1, below. Note the coating thickness shown in Table 1 is the thickness value of each upper layer 112 and lower layer 114 of tape blade 14, so that the total coating thickness is twice the value shown in Table 1. The pinch testing and load at break shown in the table below was determined using the Pinch Test described below.

Figure 8:
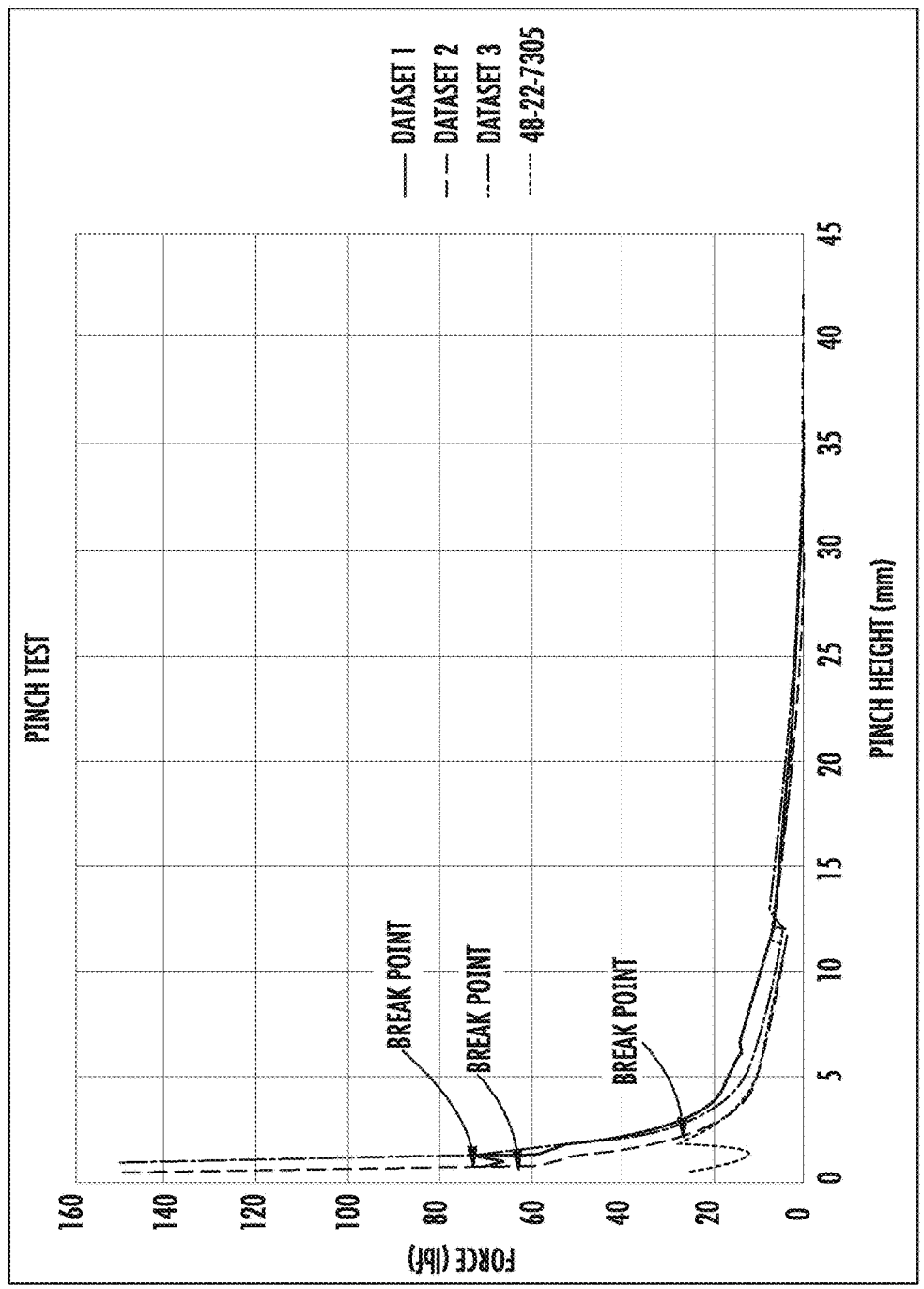
FIG. 8 shows a plot of pinch height to force for the three samples shown in Table 1 during pinch testing.

FIG. 8 shows a plot of pinch height to force for the three samples shown in Table 1 during pinch testing. The labeled portions represent the loading at which the breakage of the tape blade occurred under the loading of the pinch test. Note that the tape blade represented by dataset 3 did not break under the maximum loading during testing. As such in various embodiments, tape blade 14 as discussed herein has a pinch height at break of less than 1.5 mm, and specifically less than 1 mm. In various embodiments, tape blade 14 has a pinch load threshold (the last column in Table 1) of greater than 50 lbs. and specifically greater than 100 lbs.

Figure 24:
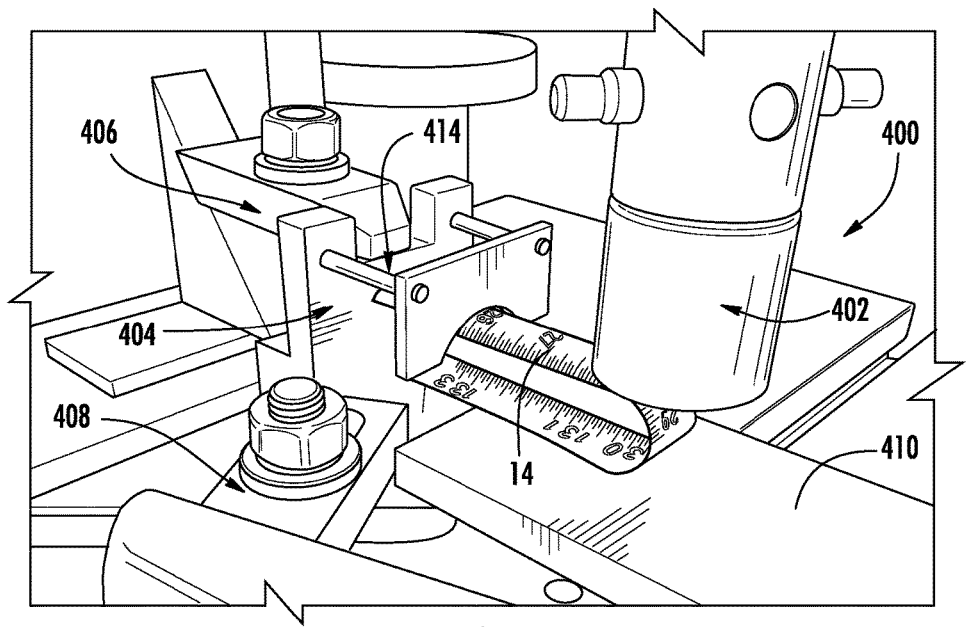
FIG. 24 is a photograph showing the set up for the tape blade Pinch Test, as discussed below.
Figure 25:
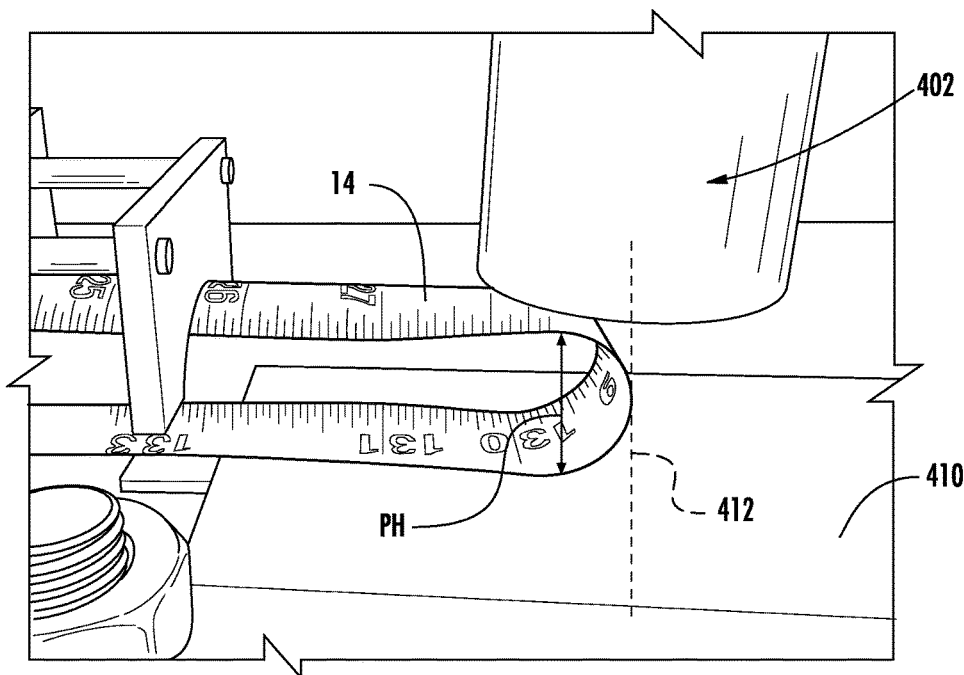
FIG. 25 is a photograph showing engagement between a mandrel and a tape blade during Pinch Test, as discussed below.

Referring to FIGS. 24 and 25, details of the Pinch Test used to generate the data shown in Table 1, is shown and described. Pinch test system 400 includes a mandrel 402, a test fixture 404, clamp assemblies 406 and 408, and an aluminum support plate 410. Test fixture 404 supports a tape blade 14 that is to be pinch tested. Test fixture 404 holds tape blade in the u-shape as shown in FIG. 25. Clamp assembly 406 secures tape blade 14 to test fixture 404, and clamp assembly 408 secures test fixture 404 to a testing table. During pinch testing a 10 inch long piece of tape 14 is used. Mandrel 402 is run by an Instron Tensile Machine. Test fixture 404 is component as shown for holding tape blade 14, and plate 410 is an 8 inch×4 inch×0.5 inch piece of extruded aluminum.

To set up the pinch test, test fixture 404 is positioned so that the u-bend in tape blade 14 is located near the vertical central axis 412 of mandrel 402, as shown in FIG. 25. Next, tape blade 14 is removed to continue setup. Next, the position of mandrel 402 is located, and the maximum displacement value is set. Specifically, mandrel 402 is lowered so that it is touching the upper surface of plate 410. At this point, mandrel extension value is set to zero. Next, the mandrel 402 is raised away from plate 410 to a height of 0.156 inches (~2× thickness of tape blade 14 being tested). At this point, the mandrel extension value is set to zero again. Next, mandrel 402 is raised to a height of about ~1.5 inches above plate 410, and the exact mandrel extension value is recorded and is set as the maximum displacement used during the pinch test. Then the mandrel extension value is set to zero again.

During pinch testing, the machine running mandrel 402 advances mandrel 402 at a rate of 1 inch per minute, and is set to stop if the load exceeds 150 lbs. Tape blade 14 is returned to its position below mandrel 402 as shown in FIG. 24, and the ends 414 of tape blade 14 are positioned flush against the back wall of test fixture 404. Next, the test is started causing mandrel 402 to advance controlled by the Instron Machine, which pinches tape blade 14 against plate 410. As shown in FIG. 25, the computer running the mandrel 402 tracks mandrel displacement, from which pinch height, PH, shown in FIG. 25, is calculated. This is run until tape 14 fails or the maximum displacement or load is reached.

Referring generally to FIGS. 9-23, various embodiments of a tape measure are shown. In various embodiments, the

TABLE 1

|  | Steel Type | Coating Material | Total Thickness (mm) (T1 + T2 + T3) | Coating Thickness (mm) (T2 or T3) | Pinch Height at Break (mm) | Load at Break (lbf) |
| --- | --- | --- | --- | --- | --- | --- |
| Dataset 1 | SK4 | Laminated Nylon | 0.4148 | 0.140 | 1.4346 | 58.16 |
| Dataset 2 | SK4 | Laminated Nylon | 0.4184 | 0.144 | 0.8103 | 62.64 |
| Dataset 3 | SK4 | Laminated Nylon | 0.5196 | 0.168 | Did not break (maxed out load cell) | 150.10 (max load, did not break) | tape measure embodiments discussed herein include innovative tape blade designs and/or innovative tape hook tab designs that may provide one or more function such as resisting blade tear, improved blade flexibility, increasing bend radius at hook/blade interface, reducing the amount of whip experienced during blade retraction (e.g., the tendency of the tape measure blade to bend or snap back on itself during fast retraction), etc.

Applicant has identified the rivet holes used for coupling the hook tabs to tape blade via rivets as locations of stress concentration and a site of blade tear origination/propagation during tape blade bending. Thus, in specific embodiments discussed herein, the hook tabs are configured to decrease or eliminate the number of rivets (and, consequently, holes) used to couple the hook tabs to the tape blade, which in turn reduces number of stress concentration sites. In particular embodiments, the hook tabs are configured to eliminate rivets that couple only a single hook tab to the tape blade.

Further, in some embodiments, the hook tabs are configured to provide for a large zone of decreasing rigidity at the end of the tape blade connected to the hook tabs. By providing a less dramatic rigidity transition between the hook tabs and the adjacent tape blade, Applicant believes that the bend radius experienced by the tape blade at the hook tab/tape blade transition can be increased, and this increase in blade bend radius acts to reduce the stress experienced by the tape blade material at the hook tab/tape blade transition. In addition, in some embodiments, the tape blade (e.g., material, material properties, layered structure, design, etc. of the tape blade) is configured to provide one or more function including tear resistance, improved flexibility, improved strength and/or whip reduction.

Figure 9:
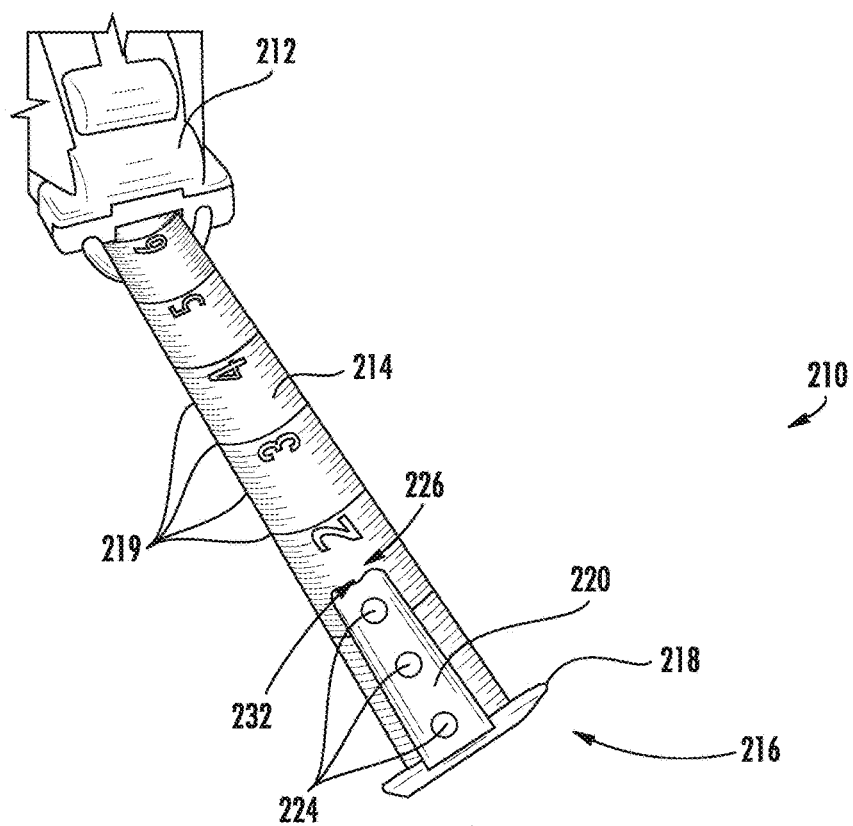
FIG. 9 is a perspective view from above of a tape measure, according to an exemplary embodiment.
Figure 10:
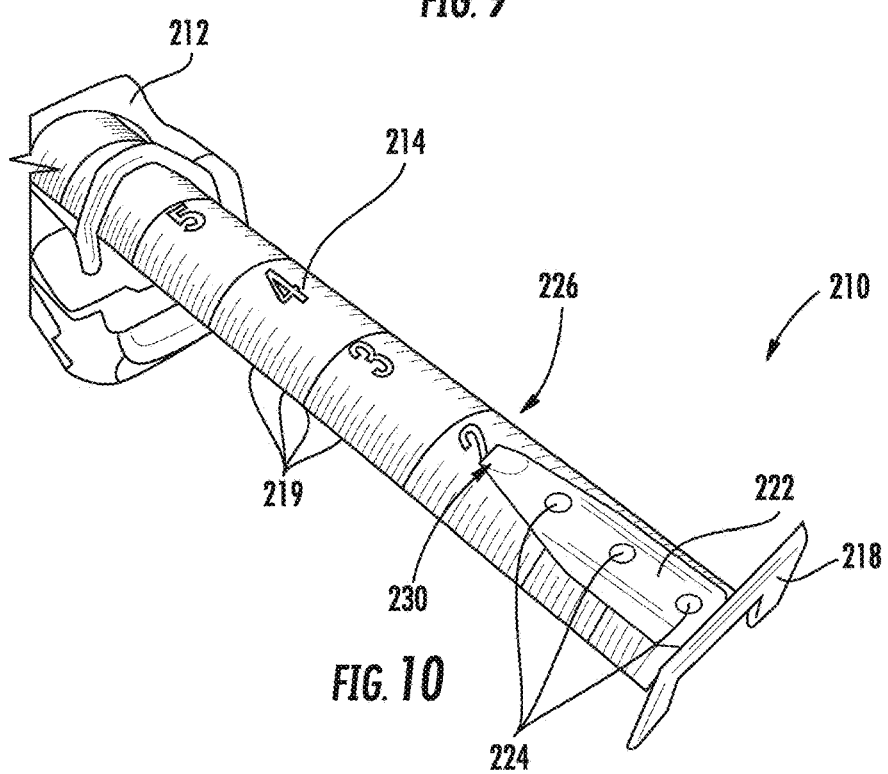
FIG. 10 is a perspective view from below of the tape measure of FIG. 9, according to an exemplary embodiment.

Referring to FIGS. 9 and 10, a tape measure, measuring tape, retractable rule, etc., such as tape measure 210, is shown according to an exemplary embodiment. In general, tape measure 210 includes a housing 212, tape blade 214 and hook assembly 216. Tape blade 214 may include any of the tape blade designs discussed above regarding FIGS. 1-8. As shown in FIGS. 9 and 10, tape blade 214 may include upper and/or lower ink layers forming measurement markings or indicia 215 visible through upper and lower polymer coatings of tape blade 214. Hook assembly 216 includes an end hook 218, an upper tab 220 and a lower tab 222. In the embodiment shown, hook assembly 216 includes a plurality of rivets 224 that extend through upper tab 220, lower tab 222 and a portion of tape blade 214 that is located between upper tab 220 and lower tab 222 such that hook assembly 216 is coupled to the outermost end of tape blade 214.

In specific embodiments, all of the rivets 224 of hook assembly 216 extend through both upper tab 220 and lower tab 222. In such embodiments, hook assembly 216 does not include an additional rivet located at the end of lower tab 222, as is typically needed in conventional hook assembly designs to couple lower tab 222 to tape blade 214. In this embodiment, the number of rivets extending through lower tab 222 is the same as the number of rivets extending through upper tab 220. Thus, in such embodiments, lower tab 222 is longer than upper tab 220, and lower tab 222 does not have any additional rivets that extend through lower tab 222 without also extending through upper tab 220. In contrast, typically there will be at least one more rivet extending through the lower tab than through upper tab in a conventional tape measure.

Applicant has identified that, while all rivet holes may act as stress concentrators, the rivet hole located furthest from the end of the tab is a more likely cause of yielding and failure. The corresponding rivet only couples the bottom tab to the tape blade, which is able to flex and allow more stress to be induced in this region of the tape blade. Thus the stress induced from bending is compounded by the geometry of the rivet hole, making this a potential region of high stress. Thus, Applicant has found that by configuring hook assembly 216 in a manner that eliminates/reduces the number of rivets or that eliminates/reduces the number of rivets that couple only one of the hook tabs 220 and 222 to tape blade 214, tape blade 214 is more tear resistant than conventional tape blades.

In specific embodiments as shown in FIG. 9 and FIG. 10, the length of lower hook tab 222 (measured along the length of tape blade 214) is greater than the length of upper hook tab 220. In this arrangement, an innermost portion 230 of lower hook tab 222 extends past the innermost portion 232 of upper hook tab 220. In specific embodiments, innermost portion 230 of lower hook tab 222 is coupled to the lower surface of tape blade 214 without a structure, such as rivet, passing through the innermost portion 230 of lower hook tab 222 and puncturing tape blade 214. In specific embodiments, innermost portion 230 is coupled to tape blade 214 via a coupling component that does not puncture tape blade 214, such as glues, adhesive material, melt bonded materials, cohesive materials, chemical bonding materials, etc.

In some embodiments, hook assembly 216 does not include any rivets 224 joining tabs 220 and 222 to tape blade 214. In such embodiments, a non-puncturing coupling component, such as glues, adhesive material, melt bonded materials, cohesive materials, chemical bonding materials, etc., are used to bond the upper and lower surfaces of tape blade 214 to hook tabs 220 and 222, respectively. In some such embodiments, lower hook tab 222 is longer than upper hook tab 220 as shown in FIGS. 9 and 10. In some other such embodiments, upper hook tab 220 is longer than lower hook tab 222 and/or is the same length as lower hook tab 222.

Figure 11A:
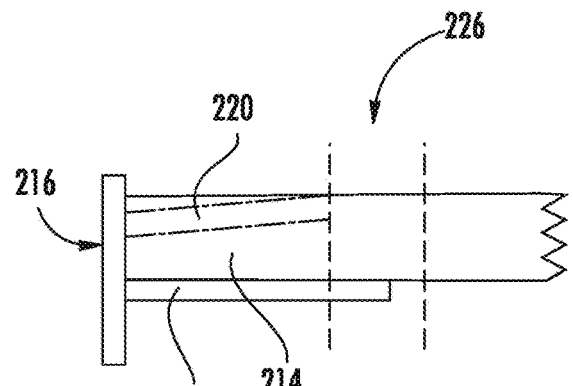
FIG. 11A is a schematic side view of a tape measure blade and hook assembly, according to an exemplary embodiment.
Figure 11B:
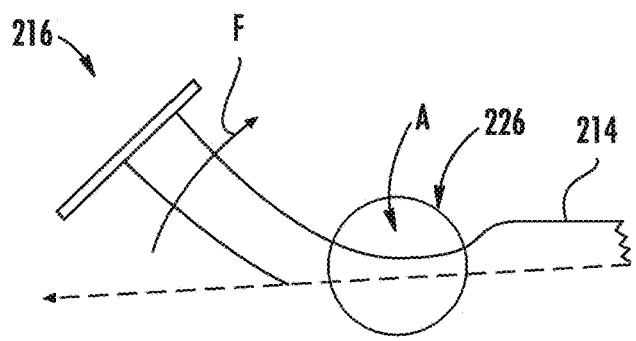
FIG. 11B is a schematic side view of a tape measure blade and hook assembly shown during bending, according to an exemplary embodiment.

Referring to FIGS. 9-11B, tape measure 210 includes a hook tab/tape blade transition area 226. In general, hook tab/tape blade transition area 226 is the region of tape blade 214 adjacent the inner ends of tabs 220 and 222 or may include a length of lower tab 222. As shown in FIGS. 11A and 11B, when a force F (e.g., force applied by a user, force generated by the momentum of the tape during retraction which may cause oscillation) is experienced at the end of tape blade 214, tape blade 214 tends to bend within transition area 226. In various embodiments discussed herein, tape blade 214 and/or hook assembly 216 is configured to provide improved tape blade performance or tear resistance. As shown in FIG. 11B, tape blade 214 and/or hook assembly 216 is configured to increase the bend radius A as generated by a particular force F (as compared to many conventional tape designs), and this increase in bend radius reduces stress within tape blade 214 during bending. In addition, in designs which reduce or eliminate the number of rivets 224 (and consequent rivet holes) (in particular, rivets 224 that only attach to one of tabs 220 or 222), the increase of bend radius A further reduces the tear potential of tape blade 214.

Referring to FIGS. 12-16, various embodiments of measuring tape hook assemblies are shown that improve flexibility in transition area 226, decrease the number of rivet holes and/or eliminate rivets and rivet holes that are located through only one of the hook tabs, and in specific embodiments, such designs improve tape blade tear resistance and/or reduce blade whip during blade retraction. It should be understood that the various hook and hook tab arrangements shown in FIGS. 12-16 are embodiments of hook assembly 216 and may be coupled to tape blade 214 of measuring tape 210.

Figure 12:
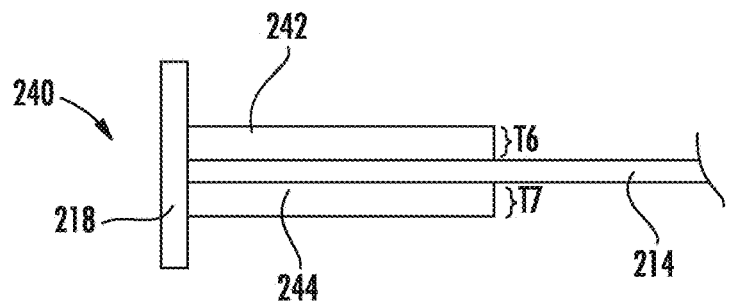
FIG. 12 is a schematic side view of a tape measure blade and hook assembly, according to another exemplary embodiment.

Referring to FIG. 12, hook assembly 240 of tape measure 210 is shown according to an exemplary embodiment. Hook assembly 240 is substantially the same as hook assembly 216, except as disclosed herein. Hook assembly 240 includes upper hook tab 242 and lower hook tab 244. In the embodiment shown, upper hook tab 242 is more flexible than lower hook tab 244. In specific embodiments, both upper hook tab 242 and lower hook tab 244 are formed from the same metal material but upper hook tab 242 is thinner than a conventional upper hook tab and/or is thinner than lower hook tab 244.

In various embodiments, upper hook tab 242 is sized relative to lower hook tab 244 to provide improved flexibility. In some such embodiments the thickness, T6, of upper hook tab 242 is less than the thickness, T7, of lower hook tab 244, and in specific embodiments, T6 is less than 75% of T7, less than 50% of T7 or less than 25% of T2. In some embodiments, the length of upper hook tab 242 is substantially the same (e.g., within 10%) as the length of lower hook tab 244 In other embodiments, upper hook tab 242 is longer than lower hook tab 244, such as 25% longer, 50% longer, 100% longer, 200% longer, etc. In such embodiments, these tab configurations provide improved flexibility, which increases the bend radius A during bending which in turn improves tape tear resistance. In embodiments, in which upper hook tab 242 and lower hook tab 244 have the same length, the entire lengths of tabs 242 and 44 provide improved flexibility relative to the thicker overlapped tab portions of conventional tape measure hook designs.

Figure 13:
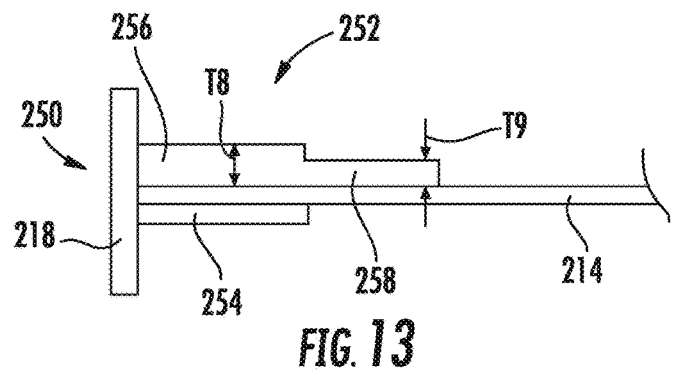
FIG. 13 is a schematic side view of a tape measure blade and hook assembly, according to another exemplary embodiment.

Referring to FIG. 13, hook assembly 250 of tape measure 210 is shown according to an exemplary embodiment. Hook assembly 250 is substantially the same as hook assembly 216, except as disclosed herein. Hook assembly 250 includes upper hook tab 252 and lower hook tab 254. In the embodiment shown, upper hook tab 252 is more flexible than lower hook tab 254. In specific embodiments, both upper hook tab 252 and lower hook tab 254 are formed from the same metal material but upper hook tab 252 includes one or more section that is thinner than a conventional upper hook tab and/or is thinner than lower hook tab 254.

As shown in FIG. 13, upper hook tab 252 includes a first portion 256 and a second portion 258. First portion 256 is located between hook 218 and second portion 258 along the upper surface of tape blade 214. First portion 256 has an average thickness, T8, that is greater than the average thickness, T9, of second portion 258. In the specific embodiment shown in FIG. 13, first portion 256 and second portion 258 have consistent thicknesses along their lengths and a vertical wall providing the transition between first portion 256 and second portion 258. In other embodiments, an angled or tapered section is located between portions 256 and 258. In yet other embodiments, first portion 256 and/or second portion 258 may be tapered or otherwise shaped such that the average thickness of second portion 258 is less than the average first portion 256.

In various embodiments, the length of second portion 258 relative to the total length of upper tab 252 along with the thicknesses T8 and T9 are selected or designed to provide the desired level of flexibility at the transition area 226. In the embodiment shown, the total length of second portion 258 is approximately half of the total length of upper tab 252. In various embodiments, the total length of second portion 258 is less than 75% of the total length of upper tab 252, and in other embodiments, the total length of second portion 258 is less than 25% of the total length of upper tab 252.

As shown in FIG. 13, the length of lower tab 254 is substantially the same as the length of first portion 256 of upper tab 252. In this arrangement, the thinner second portion 258 of upper tab 252 extends lengthwise along tape blade 214 beyond lower tab 254 such that second portion 258 provides some level support/strength to tape blade 214 beyond lower tab 254, while also providing a degree of flexibility greater than if second portion 258 had the same larger thickness as first portion 256. In some specific embodiments, because tape blade 214 tends to bend in the upward direction (e.g., as shown in FIG. 11B) second portion 258 does not include attachment points (such as rivets) coupling second portion 258 to tape blade 214. Thus, in some such embodiments, second portion 258 does not include rivets or other coupling mechanisms extending through second portion 258 and into the material of tape blade 214. As discussed above, decreasing the number of holes (e.g., for rivets) through tape blade 214 improves tape tear resistance. However, in various other embodiments, the length of lower tab 254 may be greater than, equal to or less than the total length of upper tab 252.

Figure 14:
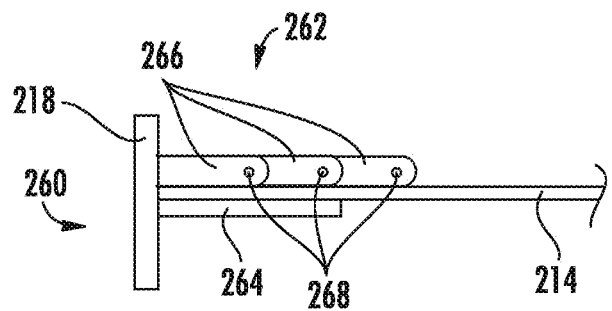
FIG. 14 is a schematic side view of a tape measure blade and hook assembly, according to another exemplary embodiment.

Referring to FIG. 14, hook assembly 260 of tape measure 210 is shown according to an exemplary embodiment. Hook assembly 260 is substantially the same as hook assembly 216, except as disclosed herein. Hook assembly 260 includes upper hook tab 262 and lower hook tab 264. In the embodiment shown, upper hook tab 262 includes a plurality of sections 266 that are joined together by joints 268. In general, joints 268 are flexible or pivoting connections between tab sections 266 that provide upper tab 262 with increased flexibility. Joints 268 may be any suitable flexible connector including flexible, elastic connectors (e.g., elastic polymer materials), pin joints, etc. In contrast to an upper tab that is a contiguous rigid piece of metal material, joints 268 allow tab sections 266 to move relative to each other effectively providing increased flexibility along the length of tabs 262 and 64, which in turn increases the bend radius A as discussed above.

In specific embodiments, upper tab 262 is longer than lower tab 264. In this arrangement, upper tab 262 extends lengthwise along tape blade 214 beyond lower tab 264 such that upper tab 262 provides some level support/strength to tape blade 214 beyond lower tab 264. In specific embodiments, the portion of upper tab 262 beyond lower tab 264 does not include rivets or other coupling mechanisms extending through upper tab 262 and into the material of tape blade 214 at the areas beyond lower tab 264. As discussed above, decreasing the number of holes (e.g., for the rivets) through tape blade 214 improves tape tear resistance. However, in various other embodiments, the length of lower tab 264 may be greater than, equal to or less than the total length of upper tab 262.

Figure 15A:
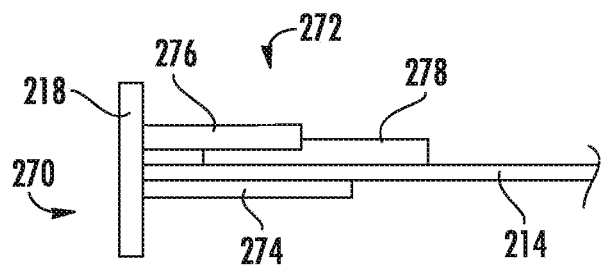
FIG. 15A is a schematic side view of tape measure blade and hook assembly, according to another exemplary embodiment.
Figure 15B:
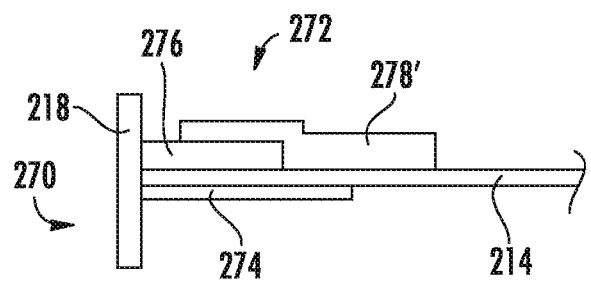
FIG. 15B is a schematic side view of a tape measure blade and hook assembly, according to another exemplary embodiment.

Referring to FIGS. 15A and 15B, hook assembly 270 of tape measure 210 is shown according to an exemplary embodiment. Hook assembly 270 is substantially the same as hook assembly 216, except as disclosed herein. Hook assembly 270 includes upper hook tab 272 and lower hook tab 274. In the embodiment shown, upper hook tab 272 includes a first portion 276 and a second portion 278 coupled to first portion 276. First portion 276 is located between hook 218 and second portion 278 along the upper surface of tape blade 214.

Second portion 278 is a tab portion that has a level of flexibility or elasticity that is greater than that of the first portion 276. In various embodiments, second portion 278 may be made from a metal material that is the same as a metal material of first portion 276 but has a lower thickness providing for improved flexibility. In another embodiment, second portion 278 may be made from a type of material that is more flexible than the material of first portion 276. In some such embodiments, first portion 276 is formed from a relatively rigid material, such as a metal material and second portion 278 is formed from a relatively flexible material, such as a polymer material, an elastomeric material, etc.

Similar to embodiments discussed above, second portion 278 extends lengthwise along tape blade 214 beyond lower tab 274. In such embodiments, second portion 278 does not include coupling elements such as rivets that pierce tape blade 214. In some such embodiments, second portion 278 is not directly coupled to tape blade 214 in the region beyond lower tab 274, and in other embodiments, second portion 278 is coupled via a non-piercing coupling structure, such as a glue or adhesive.

In the embodiment shown in FIG. 15A, second portion 278 is coupled to the lower surface of first portion 276. In this arrangement, first portion 276 overlaps a section of second portion 278, and the lower surface of second portion 278 is in contact with and/or faces tape blade 214. In the embodiment shown in FIG. 15B, second portion 278' includes a stepped section that resides over a section of first portion 276 coupling second portion 278 to first portion 276. In this arrangement, a lower surface of second portion 278 is coupled to an upper surface of first portion 276. In this arrangement, lower surfaces of both first portion 276 and second portion 278 are in contact and/or face the upper surface of tape blade 214.

Figure 16:
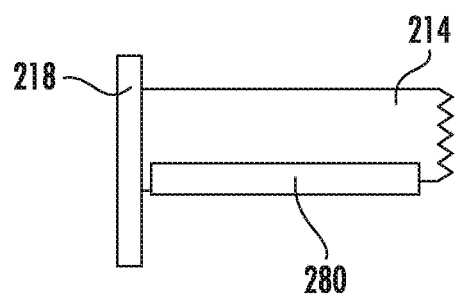
FIG. 16 is a schematic side view of a tape measure blade and hook assembly, according to another exemplary embodiment.

Referring to FIG. 16, in various embodiments, any of the hook assemblies discussed herein may include a lower hook tab, shown generally as lower tab 280, that is configured to provide improved flexibility utilizing one more of the arrangements discussed herein related to flexibility of upper tabs. In specific embodiments, lower tab 280 may be made from a thin metal material, may be formed from a flexible or polymer material, may include multiple sections and flexible joints, may include areas of reduced thickness, etc.

Figure 17:
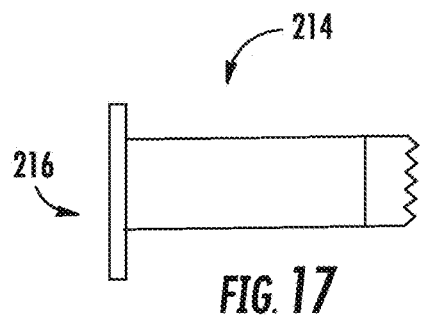
FIG. 17 is a schematic side view of a tape measure blade and hook assembly, according to another exemplary embodiment.
Figure 18A:
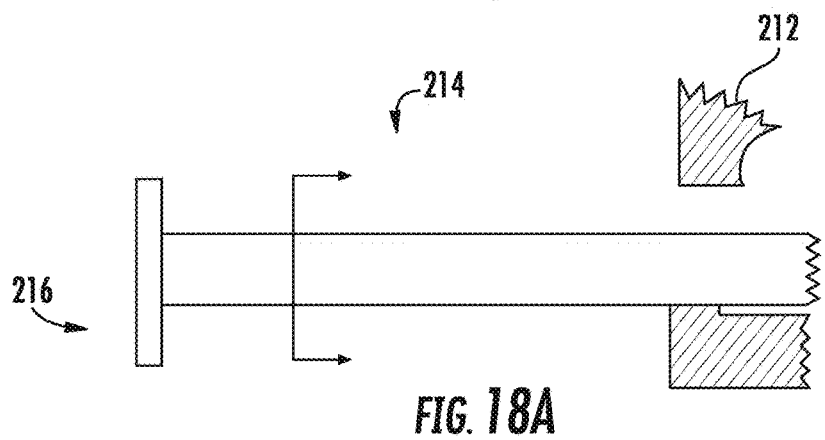
FIG. 18A is a schematic side view of a tape measure blade and hook assembly, according to another exemplary embodiment.
Figure 18B:
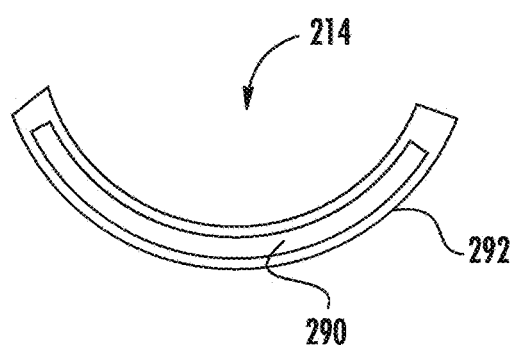
FIG. 18B is a cross-sectional view of a tape measure blade, according to an exemplary embodiment.

Referring generally to FIGS. 17-23, in various embodiments, tape measure 210 may include a tape blade 214 including one or more design, configuration, material property, and/or coating, etc. that improves tear resistance and/or that reduces whip. Referring to FIGS. 17, 18A and 18B, in various embodiments, tape blade 214 is formed from a multi-layered material. As shown in FIG. 18A and FIG. 18B, in such embodiments, tape blade 214 includes an inner core 290 surrounded by a coating 292. In general, coating 292 is a flexible material surrounding all or part of core 290, which is a more rigid material such as a metal tape material. In specific embodiments, core 290 is formed from a metal material, and coating 292 is a polymer material (e.g., polyurethane, Teflon, thermoplastic elastomer (TPE), thermoplastic urethane (TPU), Mylar, etc.), and in specific embodiments, coating 292 completely surrounds the perimeter of core 290 when viewed in cross-section taken perpendicular to the length axis of tape blade 214, as shown in FIG. 18B.

In some embodiments, coating 292 provides tear resistance by providing support to and/or limiting tear initiations in core 290. In some embodiments, the support provided by coating 292 makes tape blade 214 (or specific portions thereof) more rigid than if core 290 where not coated. In some embodiments, coating 292 is a high friction material or includes high friction material zones (e.g., has a coefficient of sliding friction greater than that of the material of core 290) that act as a brake slowing down retraction speed. By slowing down retraction speed, coating 292 provides tear resistance to tape blade 214 by reducing whip (which is a known source of tape blade tear).

In specific embodiments, coating 292 is specifically configured to provide decrease retraction speed/increase friction during retraction at specific points during retraction to limit tape tear. For example, coating 292 includes a zone of increased friction in a region adjacent hook assembly 216 such that retraction is slowed as tape blade 214 nears full retraction into tape measure housing 212. In some such embodiments, the high friction region is located within 10 feet, specifically within 8 feet and more specifically within 4 feet of hook assembly 216.

Figure 19:
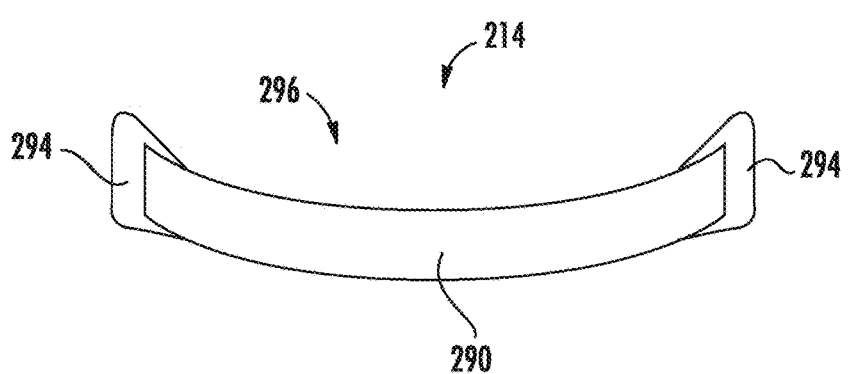
FIG. 19 is a cross-sectional view of a tape measure blade, according to another exemplary embodiment.

Referring to FIG. 19, another embodiment of tape blade 214 including a coating 294 is shown. Coating 294 is substantially the same as coating 292 except as discussed herein. In the embodiment of FIG. 19, tape blade 214 includes a coating 294 that surrounds or coats only a particular portion of blade core 290. In the specific embodiment shown, coating 294 surrounds the lateral edges of blade core 290 such that a central area 296 of blade core 290 is not coated. In this arrangement, the outer surface of blade core 290 defines the outermost surface of tape blade 214 at central area 296 and coating 294 defines the outer most surface of tape blade 214 at the coated lateral edges. In one embodiment, coating 294 extends the entire length or substantially the entire length (e.g., at least 95%, 99%, etc.) of tape blade 214 along both lateral edges of blade core 290. In various embodiments, coating 294 protects the lateral edges of blade core 290 from being damaged (e.g., limits formation of nicks, notches, etc. which in turn may initiate a tear in tape blade 214).

Figure 20:
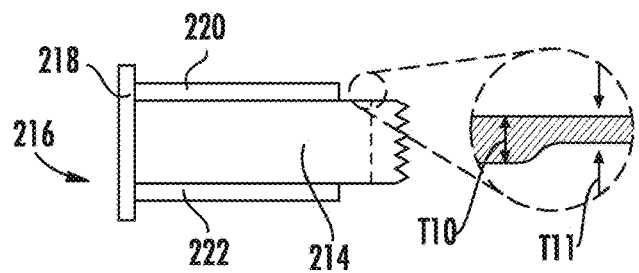
FIG. 20 is a schematic side view of a tape measure blade and hook assembly, according to another exemplary embodiment.
Figure 21:
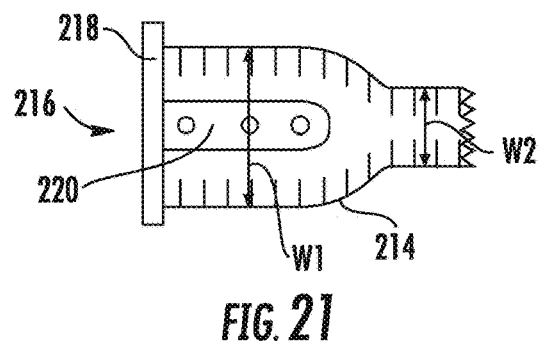
FIG. 21 is a schematic top view of a tape measure blade and hook assembly, according to another exemplary embodiment.

Referring to FIGS. 20 and 21, in various embodiments, tape blade 214 may be sized or shaped in various ways to provide tear resistances, resistance to whip and/or provide flexibility as desired for particular applications. As shown in FIG. 20, in some embodiments, the tape blade 214 (e.g., blade core 290 and/or coating 292) may be shaped to provide a decreasing blade thicknesses positioned adjacent to hook assembly 216, which in turn provides added rigidity which increases bend radius in the transition region, while still being flexible (as shown for example in FIG. 11B). As shown in FIG. 20, tape blade 214 has a first thickness T10 located adjacent the inner ends of hook tabs 220 and 222 and a second thickness T11 located beyond the ends of hook tabs 220 and 222 in the lengthwise direction. To provide the increased flexibility relative to hook tabs 220 and 222, T11 is less than T10, such as less than 75% of T10, less than 50% of T10, etc. In the specific embodiment shown hook tabs 220 and 222 have the same length as each other and the transition from the section having thickness T10 to the thinned section having thickness T11 is located beyond the inner ends of hook tabs 220 and 222 (i.e., the ends of hook tabs 220 and 222 opposite of hook 218).

As shown in FIG. 21, in some embodiments, the tape blade 214 (e.g., blade core 290 and/or coating 292) may be shaped to provide a decreasing blade width positioned adjacent to hook assembly 216, which in turn provides added rigidity which increases bend radius in the transition region, while still being flexible (as shown for example in FIG. 11B). As shown in FIG. 21, tape blade 214 has a first width W1 at the region coupled to hook tabs 220 and 222, and a second width W2 located beyond the ends of hook tabs 220 and 222 in the lengthwise direction. To provide the increased flexibility relative to hook tabs 220 and 222, W2 is less than W1, such as less than 75% of W1, less than 50% of W1, etc. In the specific embodiment shown, hook tabs 220 and 222 have the same length as each other and the transition from the section having width W1 to the narrow section having width W2 is located beyond the inner ends of hook tabs 220 and 222 in the lengthwise direction.

Figure 22:
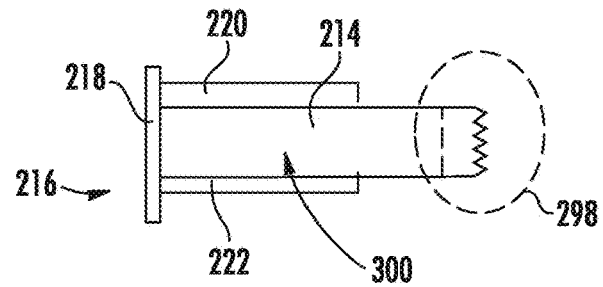
FIG. 22 is a schematic side view of a tape measure blade and hook assembly, according to another exemplary embodiment.

Referring to FIG. 22, in some embodiments, tape blade 214 (e.g., blade core 290 may have a material property that varies along the length of tape blade 214 to provide the desired flexibility, bend radius or whip-resistance. In specific embodiments, tape blade 214 may include regions 298 and 300 that include different hardness characteristics. In a specific embodiment, the hardness of the metal tape material within region 298 may be lower than the hardness of the metal tape material within region 300. As shown in FIG. 22, the hardened material in region 300 is located between tabs 220 and 222, and the less hard material of region 298 is located beyond the inner ends of tabs 220 and 222 in the lengthwise direction. Applicant believes that by locating the region of decreased hardness adjacent to but beyond the ends of hook tabs 220 and 222 improved flexibility and the increased bend radius (e.g., shown in FIG. 11B) may be achieved.

In specific embodiments, tape blade 214 may be formed from a single contiguous piece of metal material, and the differential material properties discussed herein may be achieved by processing various sections of tape blade 214 differently. For example, in specific embodiments, the differential hardness between zones 298 and 300 may be achieved by applying a hardening process to region 300 without hardening or with less hardening applied to region 298. In various embodiments, region 300 may be process using any suitable hardening process including heat treatment hardening, induction hardening, flame hardening, case hardening, etc.

In other embodiments, the differential material properties of tape blade 214 are achieved by forming tape blade 214 from a composite material, each material of which provides the differential material property. In one such embodiment, tape blade 214 may include more than one metal material, each having the desired material property, and these different metal sections are bonded together. In an exemplary embodiment, region 298 is formed from a first metal material that has a relatively low hardness, and region 300 is formed from a second, different metal material that has a relatively high hardness level. In such embodiments, the metal material of region 300 is bonded (e.g., welded, melt bonded, etc.) to the metal material of region 298 to form tape blade 214. In specific embodiments, materials having relatively high levels of flexibility are located in likely bending whip zones along the length of tape blade 214 and other regions are formed from materials having higher rigidity.

Figure 23:
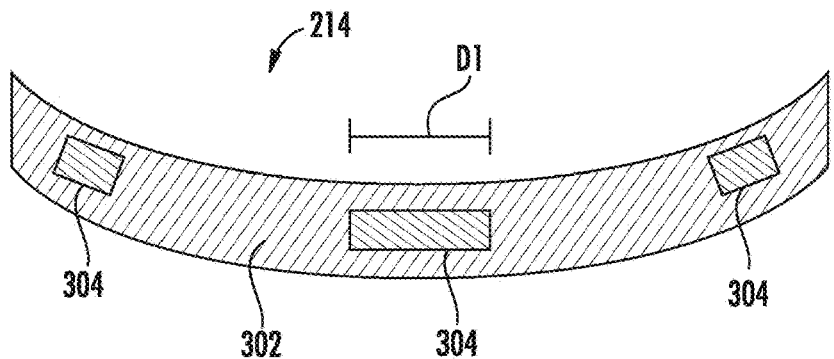
FIG. 23 is a schematic view of a tape measure blade, according to another exemplary embodiment.

Referring to FIG. 23, another embodiment of a composite tape blade 214 is shown. In this embodiment, tape blade 214 includes a main body 302 and inclusions, shown as metal strips 304, embedded in main body 302. In specific embodiments, main body 302 is formed from a polymer material, and in specific embodiments, main body 302 is formed via any suitable process including extrusion, injection molding, compression molding, etc. Metal strips 304 are sized and are positioned within main body 302 to selectively reinforce body 302 in regions to provide various functions, including improved tear resistance, improved flexibility, decrease whip, improved standout, etc. For example, metal strips 304 may be located to reinforce areas where bending/whip is likely or tear initiation is likely.

As shown in FIG. 23, each metal strip 304 includes a dimension D1 that is selected to provide tape blade 214 with the desired physical property. In various embodiments, D1 is between 1/10 of inch and 1.5 inches, and specifically is about 1/2 an inch. In various embodiments, metal strips 304 are oriented relative to the body 302 to provide reinforcement/ flexibility as discussed herein. However, in some embodiments, metal strips 304 may be oriented randomly within body 302.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
   a housing:
   a reel rotatably mounted within the housing;
   an elongate blade wound around the reel, the elongate blade comprising:
      an elongate metal core having an upper surface, a lower surface and a first thickness, T1, measured between the upper surface and the lower surface, wherein the upper surface includes a concave curved section and the lower surface includes a convex curved section;

an upper polymer coating coupled to and covering the upper surface of the elongate metal core, the upper polymer coating having a second thickness, T2, and an upper surface defining the uppermost surface of the elongate blade;

a lower polymer coating coupled to and covering the lower surface of the elongate metal core, the lower polymer coating having a third thickness, T3, and a lower surface defining the lowermost surface of the elongate blade; and an ink layer located between the upper surface of the elongate metal core and the upper polymer coating forming a series of measurement markings;

wherein T2+T3≥T1;

a spring coupled to the reel such that when the elongate blade is unwound from the reel to extend from the housing the spring stores energy and the spring release energy driving rewinding of the elongate blade on to the reel; and a hook assembly coupled to an outer end of the elongate blade.

2. The tape measure of claim 1, wherein T2+T3≥2×T1.

3. The tape measure of claim 1, wherein T2 is 0.07 mm to 0.19 mm, T3 is 0.07 mm to 0.19 mm, and T1+T2+T3 is between 0.26 mm and 0.5 mm.

4. The tape measure of claim 3, wherein T1 is between 0.09 mm and 0.2 mm.

5. The tape measure of claim 1, wherein T1 is an average thickness of the elongate metal core, and T2 and T3 are the maximum thicknesses of the upper and lower polymer coatings.

6. The tape measure of claim 1, wherein T2 is greater than T3.

7. The tape measure of claim 1, wherein the upper polymer coating is located along at least 6 ft. of the length of the elongate metal core, wherein the lower polymer coating is located along at least 6 ft. of the length of the elongate metal core.

8. The tape measure of claim 7, the upper polymer coating and the lower polymer coating are located along an entire length of the elongate metal core.

9. The tape measure of claim 1, wherein the elongate metal core comprises a steel material having a hardness of 45-60 RHC, and the upper and lower polymer coatings comprise nylon.

10. The tape measure of claim 1, wherein the elongate blade has a length less than 50 feet.

11. The tape measure of claim 1, wherein the elongate blade has a pinch height at break of less than 1.5 mm.

12. The tape measure of claim 1, wherein the elongate blade has a pinch load threshold of greater than 50 lbs.

13. The tape measure of claim 1, wherein the hook assembly comprises:
a hook;
an upper tab coupled to the upper surface of the elongate blade; and
a lower tab coupled to the lower surface of the elongate blade;
wherein the upper tab has a flexibility that is greater than a flexibility of the lower tab.

14. The tape measure of claim 13, wherein the hook assembly further comprises a plurality of rivets each extending through both the upper tab and the lower tab to couple the hook assembly to the elongate blade, wherein the lower tab is longer than the upper tab and the lower tab does not have any additional rivets that extend through the lower tab without also extending through the upper tab.

15. A tape measure comprising:
a housing:
a reel rotatably mounted within the housing;
an elongate blade wound around the reel comprising:
an elongate metal core having an upper surface, a lower surface and a metal thickness measured between the upper surface and the lower surface;
a polymer coating surrounding the elongate metal core when viewed in cross-section and extending contiguously lengthwise for at least 6 ft. along a length of the elongate metal core, the polymer coating having a polymer coating thickness;
an ink layer located between the elongate metal core and the polymer coating, the ink layer forming a series of measurement markings;
wherein the polymer coating thickness is greater than the metal thickness;
a spring coupled to the reel such that when the elongate blade is unwound from the reel to extend from the housing the spring stores energy and the spring releases energy driving rewinding of the elongate blade on the reel; and
a hook assembly coupled to an outer end of the elongate blade.

16. The tape measure of claim 15, wherein the polymer coating thickness is between 0.2 mm and 0.6 mm and the metal thickness is between 0.09 mm and 0.2 mm.

17. The tape measure of claim 16, wherein the polymer coating thickness is an average thickness of the polymer coating measured averaged along the length of the polymer coating.

18. The tape measure of claim 17, wherein the metal thickness is between 0.1 mm and 0.13 mm, wherein the elongate metal core comprises a steel material having a hardness of 45-60 RHC, and the polymer coating comprises a nylon layer.

19. A tape measure comprising:
a housing:
a reel rotatably mounted within the housing;
an elongate blade wound around the reel comprising:
an elongate metal core having an upper surface, a lower surface and a metal thickness measured between the upper surface and the lower surface;
a polymer coating surrounding the elongate metal core when viewed in cross-section and extending contiguously lengthwise for at least 6 ft. along a length of the elongate metal core, the polymer coating having a polymer coating thickness;
an ink layer located between the elongate metal core and the polymer coating, the ink layer forming a series of measurement markings;
wherein the elongate blade has a pinch load threshold of greater than 50 lbs;
a spring coupled to the reel such that when the elongate blade is unwound from the reel to extend from the housing the spring stores energy and the spring releases energy driving rewinding of the elongate blade on the reel; and
a hook assembly coupled to an outer end of the elongate blade.

20. The tape measure of claim 19, wherein the elongate blade has a pinch height at break of less than 1.5 mm, wherein the polymer coating thickness is between 0.2 mm and 0.6 mm and the metal thickness is between 0.09 mm and 0.2 mm.

* * * * *